Dec. 15, 1931.         W. M. JORDAN         1,836,372
FISH LURE
Filed July 5, 1927

Inventor
William M. Jordan
By
Attorney

Patented Dec. 15, 1931

1,836,372

UNITED STATES PATENT OFFICE

WILLIAM M. JORDAN, OF BIRMINGHAM, ALABAMA

FISH LURE

Application filed July 5, 1927. Serial No. 203,448.

My invention relates to certain new and useful improvements in fish lures or baits, and the object of my invention is to devise a spinning lure adapted to spin rapidly about its long axis as drawn through the water and provided with a novel arrangement and manner of mounting thereon of two or more sets of hooks.

One feature of my invention relates to the manner in which the line is protected from becoming twisted responsive to the spinning of the lure and this I accomplish by mounting on the swivel means which, as drawn through the water, will counteract its tendency to rotate responsive to the rotation of the spinner and thus prevent the twisting of the line. It also serves the important function of preventing fouling of the swivel bearing by grass, moss or floating matter. My invention contemplates mounting a counter-line-twisting device on the swivel as the most convenient and suitable element, but it is to be understood that this device can be mounted in any manner where its effect will counteract the tendency of the spinning lure to twist the line.

A further distinctive feature of my invention, intended both to facilitate the spinning of the lure and to reduce to a minimum its frictional engagement with the swivel, is the provision of a grease box which houses the bearing connecting the swivel to the lure.

A further distinctive feature of my invention relates to the manner of mounting the hooks on the body portion of the lure, which is preferably of flat metal of narrow width with outwardly deflected blades associated with a hook by which it is braced to its tip and which it serves to guard. By this arrangement I not only reinforce the spinner blades but I conceal all but the barbed tip of the hook.

My invention further contemplates stiffening the body of the lure by the mounting strap for the hooks, which strap serves to form in its bite a grease box for the lure's swivel bearings and a double bearing for the rivet connecting the upper hooks to the lure.

My invention further comprises the novel details of construction and arrangements of parts, which are hereinafter more particularly described and claimed, and which in their preferred embodiment only are illustrated in the accompanying drawings, which form a part of this specification, and in which:—

Figure 1:
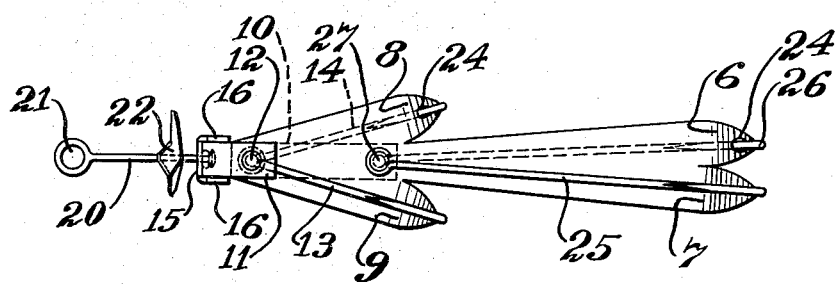
Fig. 1 is a plan view.
Figure 2:
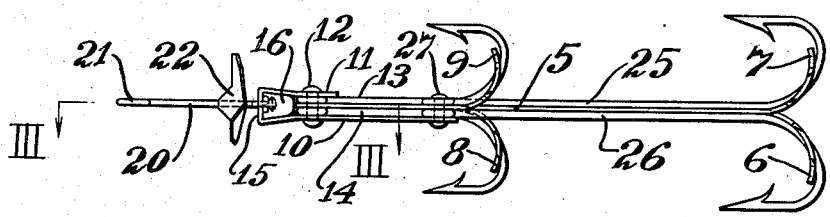
Fig. 2 a side elevation of my improved lure.
Figure 3:
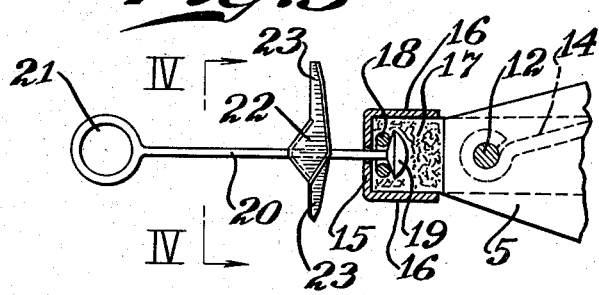
Fig. 3 is an enlarged cross-sectional view taken on the line III—III of Fig. 2.
Figure 4:
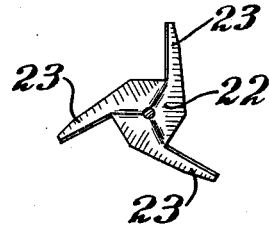
Fig. 4 is a cross-sectional view of the swivel taken on the line IV—IV of Fig. 3.

In the drawings, in which similar numerals refer to similar parts, the lure comprises a flat narrow body portion 5 elongated to simulate the appearance of a minnow as it spins and which has deflected therefrom, in its preferred embodiment, four divergent spinner blades 6, 7, 8 and 9, the blades 6 and 7 being reversely curved vertically from the plane of the base end of the body and laterally from its long axis, the blades 8 and 9 being similarly reversely curved and divergent from the head portion of the body which tapers towards and is received in the bite of a reinforcing strap 10. This strap has one end 11 thereof bent upon itself to receive a rivet 12 which passes through the head of the body and through the eyes of the two upper hooks 13 and 14, which lie on opposite sides of the body. While the hook eyes are preferably interposed within the strap bite, this is not essential, as the rivet can be passed through these eyes and secure them as well to the outside as to the inside of the strap bite. This strap bite is flattened at its upper end 15 and is formed with side flaps 16 adapted to be bent down and in on each side of the bite so as to provide an enclosed box for the grease 17 or like hard lubricant which is intended to lubricate and prevent rusting of the bearing for the inner end of the swivel. Any suitable bearing can be used but it is desirable that one that will permit very rapid rotation should be provided, and to this end I mount on the head 19 of the swivel pin 20 a bearing ring 18 which engages the end 15 of the strap bite and provides a very effective low friction bearing.

The swivel itself carries an eye 21 at its outer end for attachment thereto of the fishing line, not shown, and on the shank of this swivel I mount an element 22 provided with spinner blades 23 designed and disposed to counteract the tendency of the swivel to rotate responsive to friction from the fast spinning lure and therefore to twist the line. In other words, this will tend to spin the swivel in the opposite direction from the lure and will be designed so that it will just overcome any tendency of the line to twist while leaving the lure free to spin at the highest possible velocity.

It is important to note the manner in which the hooks 13 and 14 will act to brace the spinner blades 8 and 9. These hooks have their shanks lying on opposite sides of the lure and their curved ends lie on and against the concave faces of the blades 8 and 9 to a point near the tips of the said blades, where openings 24 are provided through which the barbed point of the hook is passed so that it receives in its bend the tip of its respective blade and braces it, while the blade itself tends to conceal and guard all but the exposed barbed end of the hook.

The spinner blades 6 and 7 are provided respectively with hooks 25 and 26 which serve to reinforce them in the manner in which the hooks 13 and 14 reinforce the spinner blades 8 and 9. These hooks 25 and 26 at their upper ends are mounted on a rivet 27 which passes through the eye of the hook 25, through the body of the lure, through the eye of the hook 26, and through the lower end of the strap 10, and thus all hooks are riveted through the lure to the strap and the lure itself is braced by being riveted near the center and at its head end to the strap. Unless it is desired to add weight to the lure, the strap 11 can be stopped below the rivet 12 but it will be carried below the rivet 27 should weight be desired, Of course, it is obviously to be understood, that the body of the lure may be dressed in any manner desired according to the type of lure contemplated, i. e., for use as a casting, trolling or fly rod bait, and my invention contemplates the addition of any additional dressing to the organization of parts as shown.

In operation, having assembled the hooks on the lure in the manner described and packed the swivel bearing box with hard grease or lubricant, the line is connected to the swivel and the lure is ready for use. As it is drawn through the water its spinner blades 6, 7, 8 and 9 act to produce a very rapid spinning of the lure about its long axis and the blades 23 on the swivel act to prevent its rotation responsive to the spinning of the lure and prevent the line twisting. The hooks brace the tips of the spinner blades, preventing them being bent out of place and the spinner blades guard and dress the hooks. Moreover, by bringing the shanks of the hooks 25 and 26 above the point of divergence of the upper spinner blades 8 and 9, they serve to brace the weakest portion of the body of the lure and provide a lure that is rugged and durable and yet possessed of most attractive qualities as a bait. The advantage of reducing the width of the body of the lure as much as possible, and particularly at its center, lies in the fact that I thus reduce the water friction and permit it to spin at a much higher velocity than in the case of the wide flat spinning lures and while thus spinning, if distinctive coloring is applied to the lure body, it will give a very striking effect and produce a most attractive bait.

An important advantage of the anti-rotating device for the line swivel lies in the fact that its blades diverge from a small hollow cone or pyramid and are disposed adjacent to the swivel connection to the lure and are shaped so as to serve also as a guard, preventing the swivel becoming fouled by grass, weeds or other matter that would catch on it by running down the line or otherwise.

The small spinner blades will not tend to spin when the lure is being cast through the air, though the larger spinner blades often times will spin through the air. When drawn through the water however the smaller blades 22 will oppose the frictional drag of the spinning lure on the line and if desired they may be designed to untwist the line where it is found that a particular lure will tend to twist it while spinning through the air.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A spinning fish lure comprising a hook bearing spinner body provided with means to cause it to spin as it is drawn through the water, a swivel for connecting the spinner body to a fish line, and means to counteract the tendency of the swivel to rotate responsive to the spinning motion of the lure.

2. A lure according to claim 1, in which the means to counteract the tendency of the swivel to be rotated by the lure comprise a spinner element tending to induce a rotation of the swivel counter to that of the lure.

3. The combination with a spinning lure, of a mounting swivel therefor having a spinner element thereon to rotate the swivel counter to the rotation of the lure.

4. The combination with a spinning lure, of a mounting swivel therefor having a spinner element thereon to rotate the swivel counter to the rotation of the lure and to serve as a guard for the swivel bearing.

5. The combination with a spinning lure, of a mounting swivel therefor having a spinner element thereon to rotate the swivel counter to the rotation of the lure, said element being of cone shape with divergent spinner blades adapted to guard the swivel bearing.

6. A spinning lure comprising a body having spinner blades, a flat strap bent to receive the lure body and to provide a swivel bearing in its bight, and hooks rigidly connected to the lure body by the rivets which connect the said body and strap.

7. A spinning lure according to claim 6, in which the strap has portions at its bight deformed to form a lubricant housing for the swivel bearing.

8. A spinning lure, comprising a body with two pairs of spinner blades, a pair of hooks mounting the lure in position to reinforce each pair of spinner blades, a stiffening strap extending centrally along the lure body, and means connecting the hooks to the strap and body at spaced points.

9. A spinning lure, comprising a body with two pairs of spinner blades, a pair of hooks mounted on the lure in juxtaposition to each pair of spinner blades to reinforce them, a stiffening strap extending centrally along the lure body and overhanging its head end, means connecting the hooks to the strap and body at spaced points, and means to connect the swivel to the overhung end of the strap.

10. A spinning lure, comprising a body with two pairs of spinner blades, a pair of hooks mounted on the lure in juxtaposition to each pair of spinner blades to reinforce them, a stiffening strap extending centrally along the lure body and overhanging its head end, means connecting the hooks to the strap and body at spaced points, and means to connect the swivel to the overhung end of the strap, said end being bent to form a lubricant chamber and housing for the swivel bearing.

11. A fishing lure of the spinner type comprising a substantially flat elongated metal body terminating in a pair of oppositely divergent curved spinner blades, and hooks attached to the opposite faces of the body, each hook having its shank resting against the body to reinforce the body, and having its barbed end projecting through its respective blade from the concave to the convex side thereof, each hook being positioned to receive the tip of its respective blade in its bite so as to reinforce the same.

In testimony whereof I affix my signature.

WILLIAM M. JORDAN.